US010428754B2

United States Patent
Kennedy et al.

(10) Patent No.: US 10,428,754 B2
(45) Date of Patent: Oct. 1, 2019

(54) INLINE STICKY TURBOCHARGER COMPONENT DIAGNOSTIC DEVICE AND SYSTEM AND METHOD OF USING THE SAME

(71) Applicant: BorgWarner Inc., Auburn Hills, MI (US)

(72) Inventors: Patrick Kennedy, Flemington, NJ (US); Sean Hastings, Arden, NC (US); Evan Lucas, Asheville, NC (US); Brian Stevens, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/355,692

(22) Filed: Nov. 18, 2016

(65) Prior Publication Data

US 2018/0142641 A1    May 24, 2018

(51) Int. Cl.
*G07C 5/08* (2006.01)
*F02D 41/22* (2006.01)
(Continued)

(52) U.S. Cl.
CPC ........ *F02D 41/221* (2013.01); *B60R 16/0234* (2013.01); *F02B 37/186* (2013.01); *F02B 37/24* (2013.01); *F02B 39/16* (2013.01); *F02D 23/00* (2013.01); *F02D 41/0007* (2013.01); *F02D 41/04* (2013.01); *F02D 41/26* (2013.01);
(Continued)

(58) Field of Classification Search
CPC ............... G07C 5/0808; G07C 5/0816; B60R 16/0232; G05B 23/0283; G05B 23/0224

USPC .......... 123/559.1, 568.2, 568.16, 339.5, 436; 73/114.76, 114.79; 455/456.2–456.3,
(Continued)

(56) References Cited

U.S. PATENT DOCUMENTS 6,497,227 B2 * 12/2002 Wang .................. F02D 41/0065
                                                123/568.16
6,687,601 B2 *  2/2004 Bale ...................... F02M 26/48
                                                123/568.16
(Continued)

FOREIGN PATENT DOCUMENTS

DE    102007056557 A1    5/2009
JP       2007113427 A    5/2007
(Continued)

OTHER PUBLICATIONS

Design of a Fault Diagnostic System for an ABS Based on Dual-CPU Structure; Yu Guizhen; Zhang Chengyang; Ding Nenggen 2006 IEEE International Conference on Vehicular Electronics and Safety; Year: 2006; pp. 174-177.*
(Continued)

*Primary Examiner* — Cuong H Nguyen
(74) *Attorney, Agent, or Firm* — BrooksGroup

(57) ABSTRACT

A number of variations may include a product including an inline diagnostic device connected to a control status line at a position between an electronic control unit (ECU) and a turbocharger component actuator, the inline diagnostic device being constructed and arranged to intercept data being transmitted from the actuator to the ECU, and to process the data intercepted from the actuator to determine whether the components are binding or sticking, and to transmit a signal indicating that the components are binding or sticking.

19 Claims, 5 Drawing Sheets

(51) Int. Cl.

| | |
|---|---|
| *F02M 26/04* | (2016.01) |
| *F02M 26/09* | (2016.01) |
| *B60R 16/023* | (2006.01) |
| *F02B 37/24* | (2006.01) |
| *F02D 23/00* | (2006.01) |
| *F02D 41/00* | (2006.01) |
| *F02D 41/04* | (2006.01) |
| *F02D 41/26* | (2006.01) |
| *F02B 37/18* | (2006.01) |
| *F02B 39/16* | (2006.01) |
| *G05B 23/02* | (2006.01) |

(52) U.S. Cl.
CPC ............ *F02M 26/04* (2016.02); *F02M 26/09* (2016.02); *G07C 5/0808* (2013.01); *G05B 23/0227* (2013.01); *G05B 23/0283* (2013.01); *Y02T 10/144* (2013.01); *Y02T 10/40* (2013.01)

(58) Field of Classification Search
USPC ...... 455/418; 701/34, 102, 111; 180/339.15; 60/277
See application file for complete search history.

(56) References Cited

U.S. PATENT DOCUMENTS

| | | | | |
|---|---|---|---|---|
| 7,657,360 | B2* | 2/2010 | Skowron | G05B 23/0227 123/339.15 |
| 8,336,291 | B2* | 12/2012 | Hanari | F02B 39/16 60/274 |
| 9,612,174 | B2* | 4/2017 | Peters | G01L 11/04 |
| 9,650,975 | B2* | 5/2017 | Lee | F02D 41/221 |
| 9,709,009 | B2* | 7/2017 | Miyazaki | F02M 26/05 |
| 2002/0129799 | A1* | 9/2002 | Wang | F02M 26/48 123/568.16 |
| 2002/0144674 | A1* | 10/2002 | Wang | F02D 41/0065 123/568.21 |
| 2003/0182049 | A1* | 9/2003 | Bale | F02M 26/48 701/108 |
| 2007/0294441 | A1 | 12/2007 | Collins | |
| 2008/0082181 | A1 | 4/2008 | Miller et al. | |
| 2008/0088850 | A1* | 4/2008 | Skowron | G05B 23/0227 356/476 |
| 2008/0209887 | A1* | 9/2008 | Hanari | F02B 37/22 60/277 |
| 2009/0274602 | A1* | 11/2009 | Alward | B01D 39/2082 423/239.1 |
| 2010/0324857 | A1 | 12/2010 | Bleile et al. | |
| 2011/0023846 | A1* | 2/2011 | Miyazaki | F02M 26/05 123/568.16 |
| 2011/0098409 | A1* | 4/2011 | Burch | C08K 3/0008 524/600 |
| 2011/0168131 | A1* | 7/2011 | McDonald | F01L 1/34 123/436 |
| 2013/0171396 | A1* | 7/2013 | Burch | B29D 22/00 428/36.9 |
| 2014/0025249 | A1* | 1/2014 | Giles | G05B 23/0235 701/29.2 |
| 2015/0371461 | A1* | 12/2015 | Treharne | G01R 31/007 701/31.4 |
| 2016/0025043 | A1* | 1/2016 | Lee | F02D 41/221 123/568.12 |
| 2016/0138526 | A1* | 5/2016 | Peters | G01L 11/04 123/559.1 |
| 2018/0142641 | A1* | 5/2018 | Kennedy | F02M 26/04 |

FOREIGN PATENT DOCUMENTS

| | | |
|---|---|---|
| WO | 2009060155 A2 | 5/2009 |
| WO | 2013074094 A1 | 5/2013 |
| WO | 2016113889 A1 | 7/2016 |
| WO | WO-2018093801 A1 * | 5/2018 ............ F02M 26/04 |

OTHER PUBLICATIONS

On-Line Sensor Diagnosis of the Diesel Engine Cold Starting Based on RBFNN; Mingjiang Hu; Zhong Wang; Yinnan Yuan; Liqiao Qi 2009 IEEE Circuits and Systems International Conference on Testing and Diagnosis; Year: 2009; pp. 1-4.*
RBF Networks-Based Adaptive Inverse Model Control System for Electronic Throttle ; Yuan Xiaofang; Wang Yaonan; Sun Wei; Wu Lianghong; IEEE Transactions on Control Systems Technology; Year: 2010, vol. 18, Issue: 3; pp. 750-756.*
Practical applications of timed failure propagation graphs for vehicle diagnosis; Stanley C. Ofsthun; Sherif Abdelwahed 2007 IEEE Autotestcon; Year: 2007; pp. 250-259.*
A comparative study of EMD, EWT and VMD for detecting the oscillation in control loop; Awang N. I. Wardana; 2016 International Seminar on Application for Technology of Information and Communication (ISemantic); Year: 2016; pp. 58-63; IEEE Conferences.*
Microfluidic MEMS; A.K. Henning; 1998 IEEE Aerospace Conference Proceedings (Cat. No. 98TH8339); Year: 1998 , vol. 1 pp. 471-486 vol. 1; IEEE Conferences.*
Inline Diagnostic Systems for the Characterization of Multi-Junction Solar Cells; Tim Ellison ; David Dodge ; Jeff Karn ; Rob Kopf ; Rujiang Liu ; Mark Lycette ; Wayne Messing; 2006 IEEE 4th World Conference on Photovoltaic Energy Conference; Year: 2006 vol. 2; pp. 1736-1739.*
International Search Report and Written Opinion; dated Feb. 2, 2018; for International Application No. PCT/US2017/061654; 15 pages.

* cited by examiner

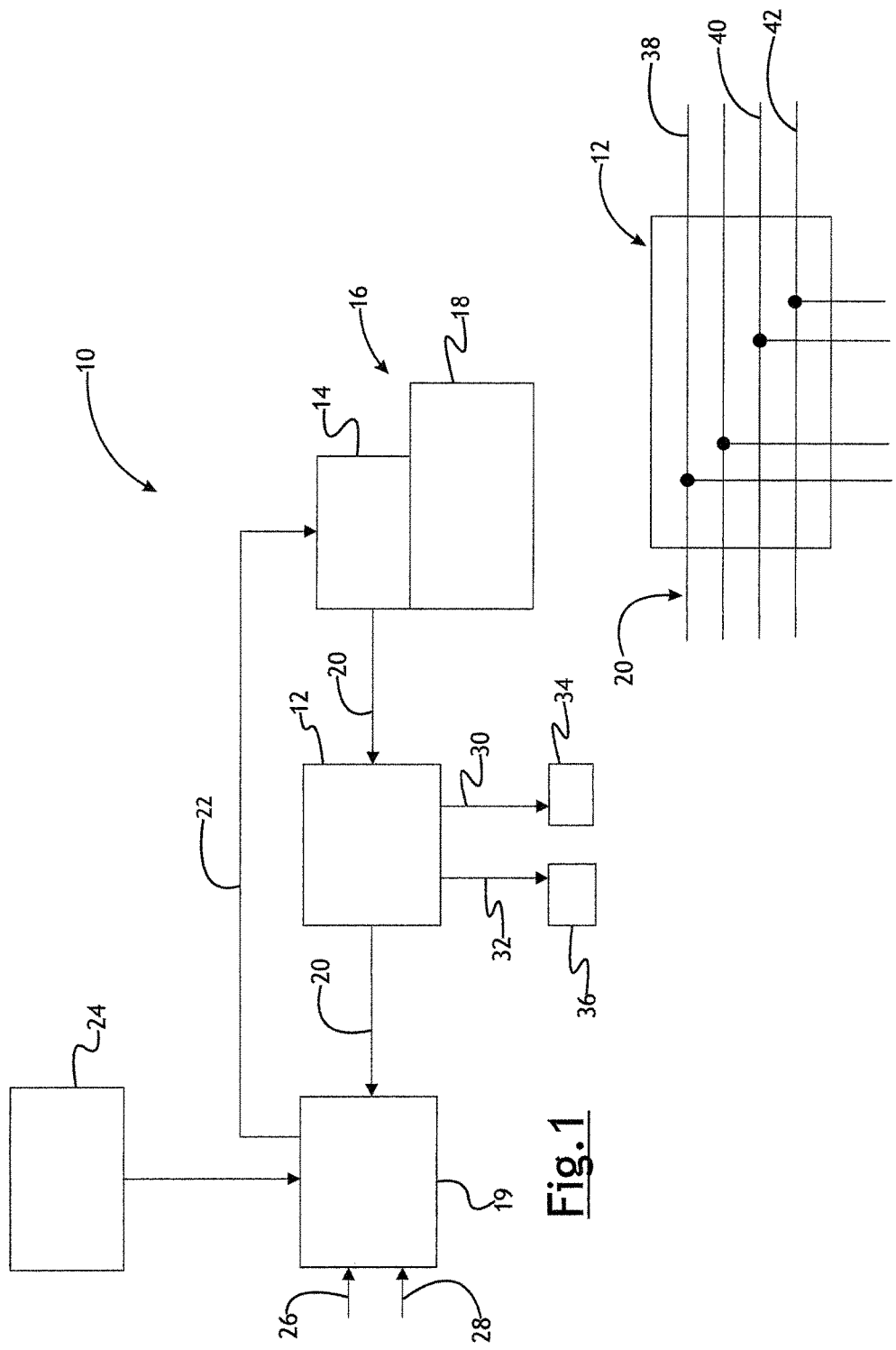

INLINE STICKY TURBOCHARGER COMPONENT DIAGNOSTIC DEVICE AND SYSTEM AND METHOD OF USING THE SAME

TECHNICAL FIELD

The field to which the disclosure generally relates to includes devices that diagnose the sticking or binding of electrically actuated turbocharger components, systems and methods of using the same.

BACKGROUND

As components wear they experience different wear patterns. When two surfaces rub against each other, they first experience sliding wear and then transition into adhesive wear. Adhesive wear is characterized by the two components temporarily binding together as they slide past each other, requiring more effort to achieve the same motion. This wear is undesirable and can lead to components becoming completely stuck. As an example, variable turbine geometry (VTG) turbocharger assembly wears the vane may begin to stick or become complete stuck. The result of vanes sticking is a change in power requirements for the actuator and in a more developed wear case the VTG assembly cannot return to the initial position using only a spring return mechanism. Heretofore, the only way for a customer to determine if a VTG assembly is experiencing vane sticking is to wait until critical failure, when the vanes are completely stuck and an electronic control unit (ECU), connected to the actuator, throws an error indicating to the customer that the VTG assembly has failed. Heretofore, the only way for a technician to confirm if the VTG assembly is experiencing vane sticking is to manually cycle the VTG.

SUMMARY OF ILLUSTRATIVE VARIATIONS

A number of variations may include a product including a diagnostic device connected to a control status line at a position between an electronic control unit (ECU) and a turbocharger actuator, or located in the ECU, the diagnostic device being constructed and arranged to intercept data being transmitted from the actuator to the ECU, and to compare the data intercepted to itself using autocorrelation that correlates a signal indicative of power demand at different intervals of time to determine if there are repeating power demand patterns that indicate sticking of a turbocharger component moved by the actuator, and to transmit a signal indicating that the turbocharger component is sticking if there are repeating power demand patterns that indicate sticking of a turbocharger component.

A number of variations may include a product including an inline diagnostic device connected to a control status line at a position between an electronic control unit (ECU) and a VTG turbocharger actuator, the inline diagnostic device being constructed and arranged to intercept data being transmitted from the actuator to the ECU, and to compare the data intercepted from the actuator with known data indicative of a turbocharger assembly having VTG vanes, or other components, that are not sticking, and to transmit a signal indicating that the assembly components are sticking if the intercepted data is outside a predetermined range of the known data.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 is a schematic illustration of a product including an inline diagnostic device for detecting sticking turbocharger vanes according to a number of variations.

FIG. 2 is a schematic illustration of an inline diagnostic device for detecting sticking turbocharger vanes constructed and arranged to intercept data transmitted from a turbocharger vane actuator according to a number of variations.

DETAILED DESCRIPTION OF ILLUSTRATIVE VARIATIONS

Figure 3:
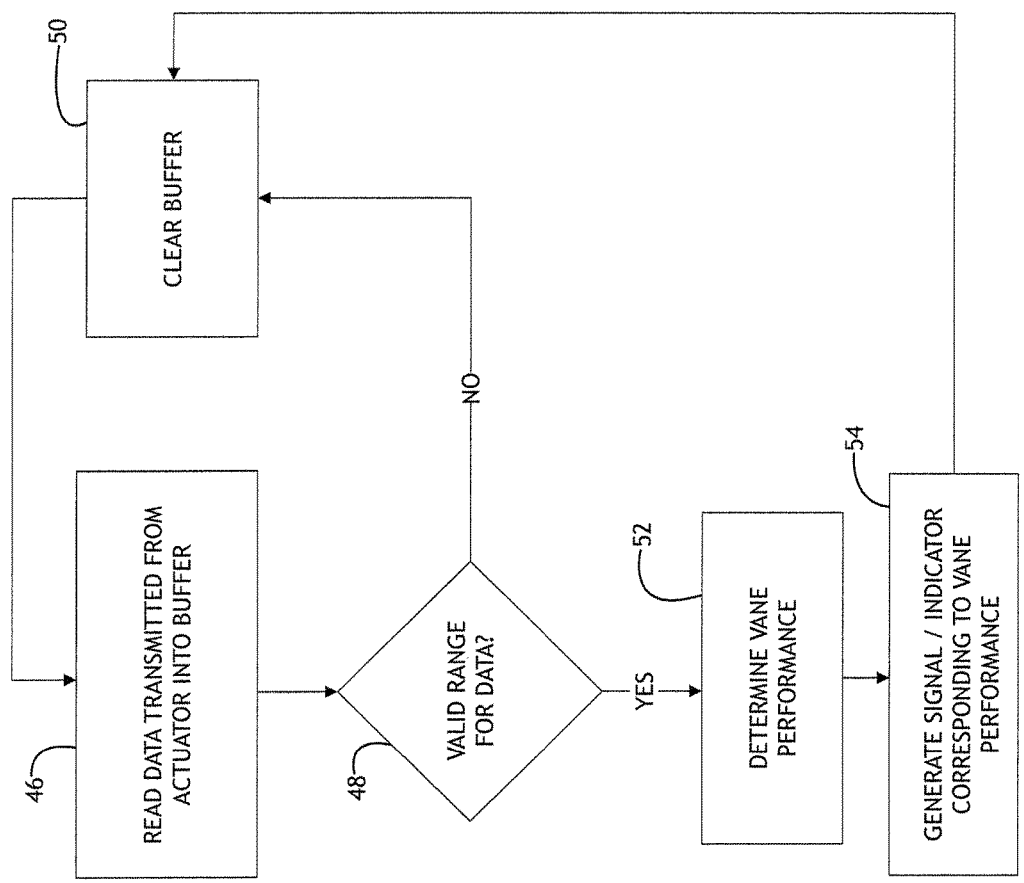
FIG. 3 is a schematic illustration of a method of using an inline diagnostic device for detecting sticking turbocharger vanes according to a number of variations.

The following description of the variations is merely illustrative in nature and is in no way intended to limit the scope of the invention, its application, or uses.

A number of variations may include a product including a diagnostic device connected to a control status line at a position between an electronic control unit (ECU) and a turbocharger actuator, or at a position located in the ECU, the diagnostic device being constructed and arranged to intercept data being transmitted from the actuator to the ECU, and to compare the data intercepted to itself using autocorrelation that correlates a signal indicative of power demand at different intervals of time to determine if there are repeating power demand patterns that indicate sticking of a turbocharger component moved by the actuator, and to transmit a signal indicating that the turbocharger component is sticking if there are repeating power demand patterns that indicate sticking of a turbocharger component. The turbocharger component may be any of a variety of components including, but not limited to, turbocharger vanes or wastegate valves.

A number of variations may include a product comprising an inline diagnostic device connected to a control status line at a position between an electronic control unit and a VTG turbocharger actuator, the inline diagnostic device being constructed and arranged to intercept data being transmitted from the actuator to the ECU, and to compare the data intercepted from the actuator with known data indicative of a VTG turbocharger assembly having vanes that are not sticking, and to transmit a signal indicating that the vanes are sticking if the intercepted data is outside a predetermined range of the known data. The inline diagnostic device may also be constructed and arranged to transmit a signal indicating that the vanes are not sticking if the intercepted data is within a predetermined range of the known data. In a number of variations the diagnostic device may be located in the ECU or the actuator itself.

Referring now to FIGS. 1-2, in a number of variations, a product 10 may include an inline diagnostic device 12 positioned between an actuator 14, of a turbocharger assembly 16 including the actuator 14 and a turbocharger 18, and an electronic control unit (ECU) 19. The ECU 19 may provide a command signal through line 22 to the actuator 14 and the actuator 14 may send data through a control status line 20 to the inline diagnostic device 12 and the ECU 19. The ECU 19 may receive inputs, 26, 28 from a variety of components in the engine breathing system (a general description of which will be provided hereafter). A power source 24 may be connected directly or indirectly to the ECU 19. The inline diagnostic device 12 may be constructed and arranged to intercept data sent from the actuator 14 to the ECU 19. The diagnostic device 12 may be constructed and arranged to intercept data being transmitted from the actuator to the ECU, and to compare the data intercepted to itself using autocorrelation that self-correlates a signal indicative of power demand at different intervals of time to determine if there are repeating power demand patterns that indicate sticking of a turbocharger component moved by the actuator, and to transmit a signal indicating that the turbocharger component is sticking if there are repeating power demand patterns that indicate sticking of a turbocharger component. The turbocharger component may be any of a variety of components including, but not limited to, turbocharger vanes, wastegate valves or recirculation valves.

The autocorrelation may correlate a signal indicative of power demand at different intervals of time to determine if there are repeating power demand patterns that indicate sticking of a turbocharger component moved by the actuator including, but not limited to, spikes in power demand and/or recovery phases of spikes in power demand that repeat during specific time intervals in the movement of the turbocharge component actuated by the actuator. The diagnostic device may also determine and compare the frequency in which patterns in signal indicative of power demand occur.

In a number of variations, the inline diagnostic device 12 may be constructed and arranged to perform calculations, use a look up table, and conduct comparisons between real time data intercepted from the actuator and the calculations or look up table data to make a determination as to whether the VTG vanes are experiencing the onset of vane sticking. The inline diagnostic device 12 may be constructed and arranged to perform calculations regarding data and make determinations if a VTG turbocharger is experiencing vane sticking before the turbo charger vane completely stuck. The inline diagnostic device 12 may be constructed and arranged to perform steps including calculating and determining if an increase in power draw by the actuator is greater than an acceptable percentage above a known amount of power draw under the operating conditions of the engine breathing system for a VTG turbocharger know not to be experiencing vane sticking; calculating and determining whether the frequency of an increase in current draw over a number of vane movement cycles is within an acceptable range; and/or calculating and determining whether an increase in current draw is over that of a known good VTG turbocharger under the operating conditions occurs for a period of time which is longer than acceptable.

The inline diagnostic device 12 may generate one or more signals 30, 32 to one or more operator indicator components 34, 36 to let the operator of the vehicle know that the turbocharger vanes are beginning to stick and/or that the turbocharger vanes are not sticking. Examples of such indicators would include, but are not limited to, a vehicle code, a light, a message on a visible display monitor, a gauge indicator, and/or an audio alert device.

Referring now to FIG. 2, the inline diagnostic device 12 may be constructed and arranged to be powered by the power line 38 in the control status line 20, and may be constructed and arranged to read the controller area network (CAN) high and CAN low signal lines 40,42 respectively, in the status control line 20. The inline diagnostic device 12 may be a CAN transceiver. The inline diagnostic device 12 may include a microprocessor and memory to perform calculations, store data, including but not limited to, look up tables and data intercepted from the CAN high and CAN low signals lines, and perform comparisons. In a number of variations, the calculations and comparison may be performed completely by the inline diagnostic device 12 without use of an external electronic control unit or module.

Referring now to FIG. 3, in a number of variations, a method of using the inline diagnostic device 12 may include the step 46 of reading data transmitted by the actuator into a buffer of the device; step 48 processing the data, and if not, in step 50 clearing the buffer, or if yes performing step 52 of determining the vane performance, and based upon the determination in step 54 generating a signal/indicator corresponding to the vane performance.

The following description of a VTG turbocharger and engine breathing system are provides to illustrate possible environments in which the inline diagnostic device 12 may be used according to a number of variations.

Figure 4:
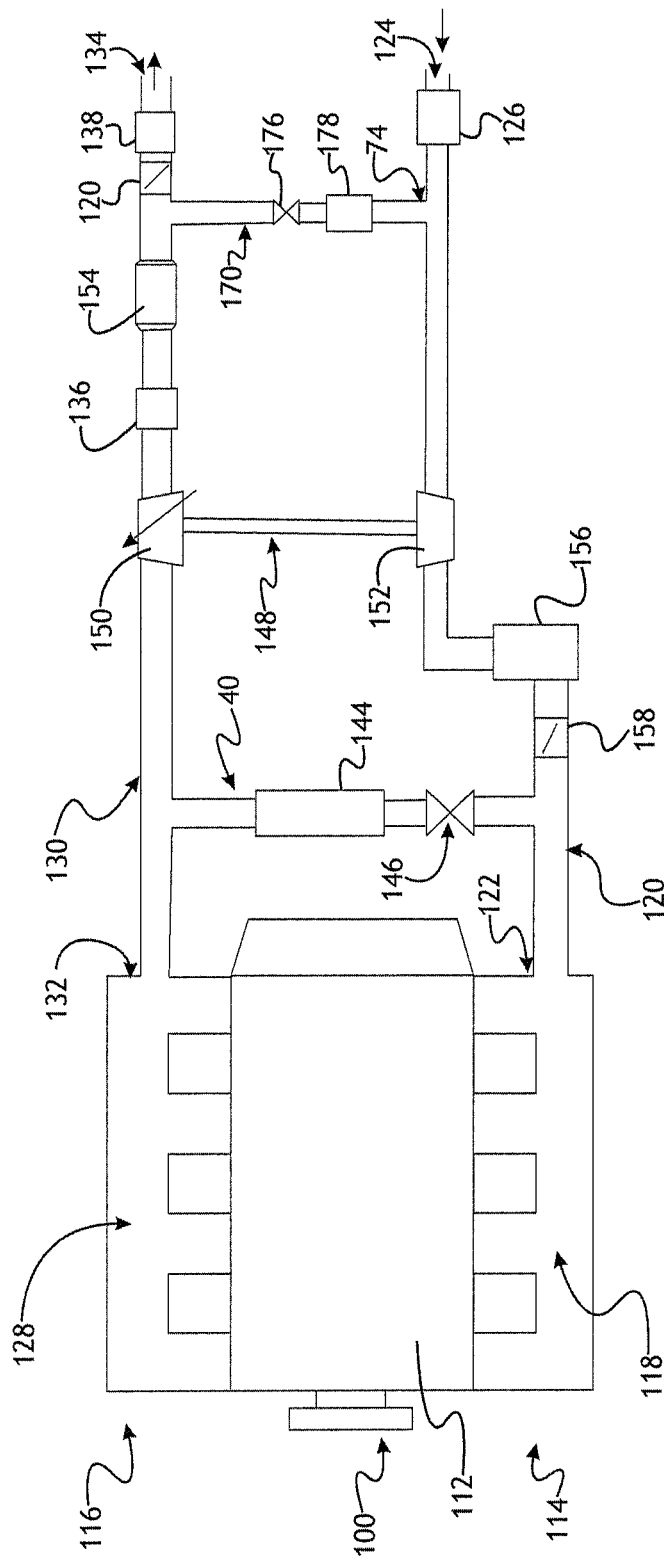
FIG. 4 is a schematic illustration of an engine breathing system in which an inline diagnostic device for detecting sticking turbocharger vanes may be used according to a number of variations.

Referring now to FIG. 4, in a number of variations the incline diagnostic device 12 may be used in a product 100 including a combustion engine 112, an air intake side 114 and an exhaust side 116. The air intake side 114 may include an air intake manifold 118 connected to the engine 112 and an intake conduit 120 generally at 122. The air intake conduit 120 may have an open end 124 and an air filter 126 downstream thereof. A low pressure exhaust gas recirculation loop 170 may connect to the air intake conduit 120, A turbocharger 148 may be provided with a compressor 152 connected to the air intake conduit 120 to compress air flowing therethrough. An air cooler 156 and air throttle valve 158 may be provided in the air intake conduit 120 downstream of the compressor 152. A high pressure exhaust gas recirculation loop 170 may connect to the air intake conduit 120 downstream of the compressor 152.

The exhaust side 116 may include an exhaust manifold 128 connected to the engine 112 and an exhaust conduit 130 generally at 132. A high pressure recirculation loop 140 may connect to the exhaust conduit 130. The high pressure recirculation loop 140 may include a cooler 144 and an exhaust gas recirculation valve 146. A turbine 150 of the turbocharger 148 may connected to the exhaust conduit 130 and includes including adjustable vanes. A particulate trap 136, catalytic converter 154, exhaust throttle valve 120 and muffler 138 may be provided in the exhaust conduit 130. The exhaust conduit 130 may have an open end 134. A variety of the components in the engine breathing system may have an effect on the current draw of the actuator during movement of the turbine vanes.

Figure 5:
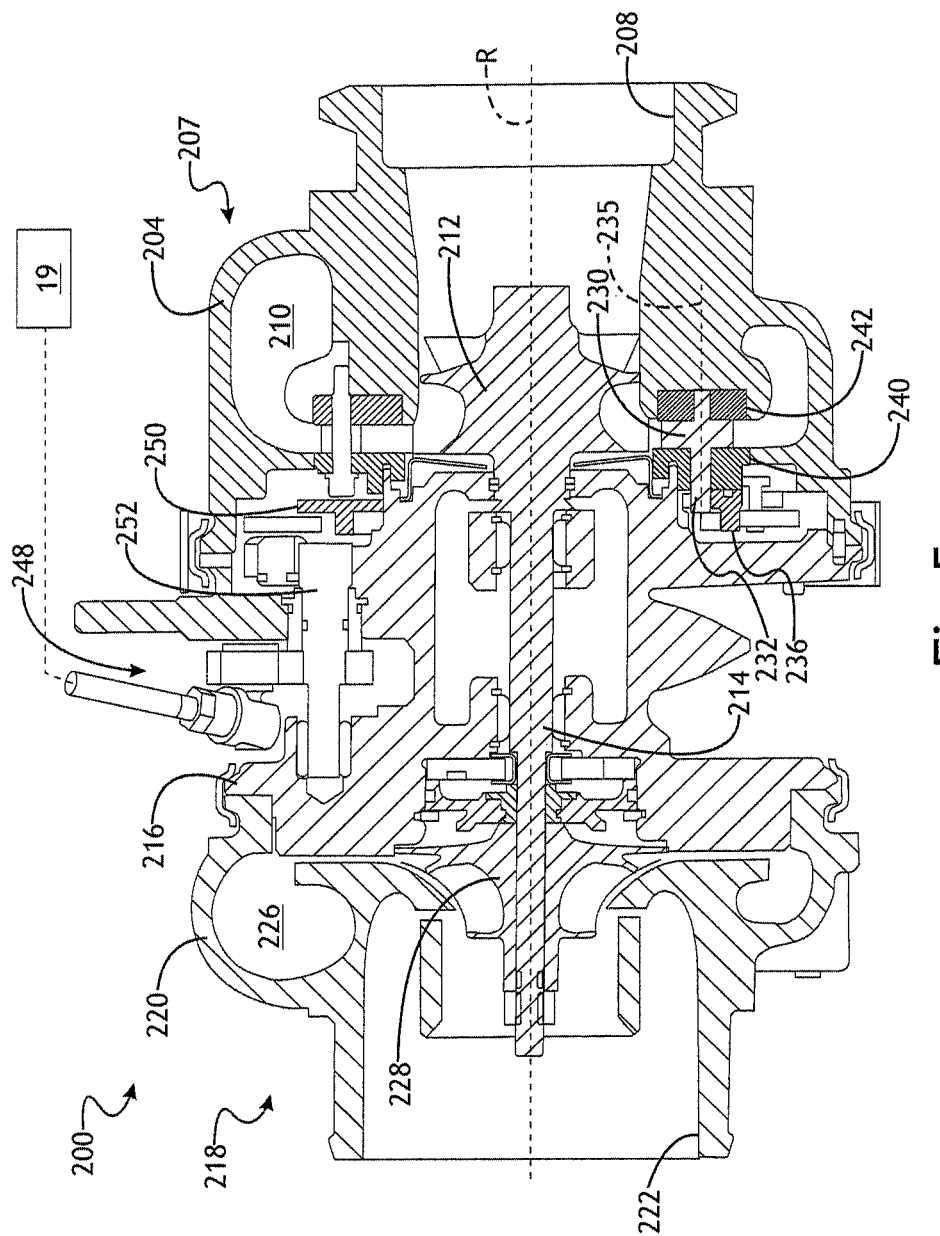
FIG. 5 a sectional view of a turbocharger assembly including adjustable vanes and a vane actuator according to a number of variations.

Referring to FIG. 5, in a number of variations, an exhaust gas turbocharger 200 may include a turbine section 202, a compressor section 218, and a center bearing housing 216 disposed between and connecting the compressor section 218 to the turbine section 202. The turbine section 202 may include a turbine housing 4 constructed and arranged to define an exhaust gas inlet (not shown), an exhaust gas outlet 208, a turbine volute 200 disposed in the path between the exhaust gas inlet and the exhaust gas outlet 208. A turbine wheel 212 may be disposed in the turbine housing 214 between the turbine volute 210 and the exhaust gas outlet 208. A shaft 214 may be connected to the turbine wheel 212 and supported for rotation about axis R within the bearing housing 216 and may extend into the compressor section 218. The compressor section 218 may include a compressor housing 220 that is constructed and arranged to define an axially-extending air inlet 222, and air outlet (not shown), and a compressor volute 226. A compressor wheel 228 may be disposed in the compressor housing 220 between the air inlet 222 and the compressor volute 226 and may be connected to the shaft 214.

In a number of variations, the turbocharger 200 may be a variable turbine geometry turbocharger (VTG). The turbine section 202 may include a plurality of pivotal vanes 230 to control the flow of exhaust gas that impinges on the turbine wheel 212. The vanes 230 may also control the pressure ratio generated by the compressor section 218. In vehicles that include a high pressure exhaust gas recirculation loop upstream of the turbocharger, the vanes 230 may also be used to control and generate exhaust back pressure.

Figure 6:
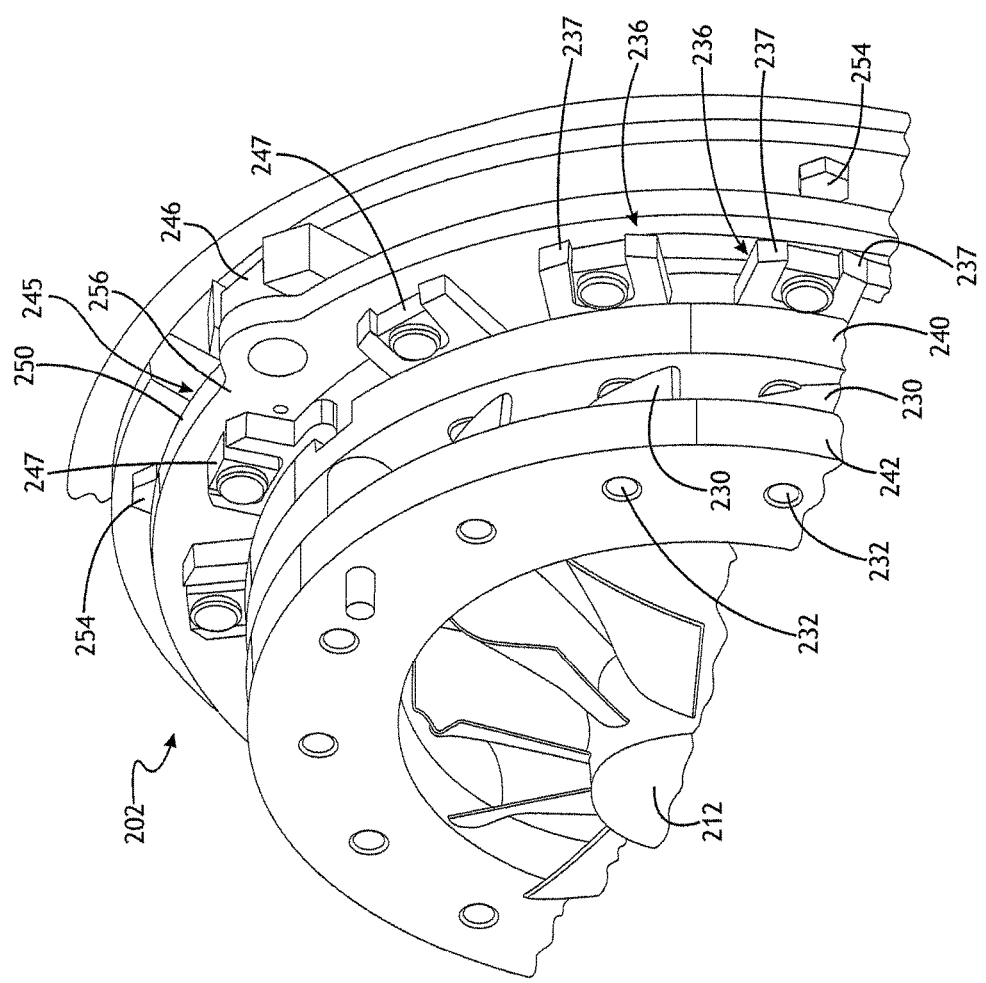
FIG. 6 is a partial perspective view of according to a number of variations.

Referring now to FIG. 6, the vanes may be arranged in a generally circular array around the turbine wheel 212, and located between the turbine volute 210 and the turbine wheel 212. The vanes may be pivotally supported in this configuration between a generally annular upper vane ring 240 and a generally annular roller ring 242, where "upper" refers to being closer to the center bearing housing 216 and "lower" refers to being closer to the turbine housing 204. Each vane 230 may rotate on a post 232 that protrudes from the opposite faces of the vane 230. The free ends of the post 232 may be received in respective apertures in the upper vane ring 240 and the lower vane ring 242. The annular orientation of the upper vane ring 240 relative to the lower vane ring 242 may be set such that the corresponding apertures in the vane rings 240, 242 are concentric with an axis of each post 232, and the vane 230 is free to rotate about the axis. On the upper vane ring side of the vane 230, the post 232 protrudes through a corresponding aperture of the upper vane ring 240 and is affixed to a vane lever 236, which controls the rotational position of the vane 230 with respect to the vane rings 240, 242. An adjustment ring assembly 245 may be arranged adjacent to and parallel with the upper vane ring 240 and may be constructed and arranged to control the position of all the vane levers 236 in unison.

In a number of variations, the adjustment ring assembly 245 may include the adjustment ring 250, small side blocks 247 rotatably disposed on the turbine facing side of the adjustment ring 250, and a large block 246 that is rotatably disposed on the compressor face side of the adjustment ring 250 and may be used to connect the adjustment ring 250 to an actuator.

In a number of variations, the adjustment ring assembly 45 may be constructed and arranged to rotatably drive the vanes 230 via the vane levers 236, which link the adjustment ring assembly 245 to each individual vane 230. In a number of variations, fork arms 237 may be formed on the ends of the vane levers 36 to drive the independently rotatable side blocks 247 to minimize friction in the system and to accommodate distortion and corrosion of the turbine housing, and thus leakages.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including a diagnostic device connected to a control status line at a position between an electronic control unit (ECU) and a turbocharger actuator, or at a position located in the ECU or actuator, the diagnostic device being constructed and arranged to intercept data being transmitted from the actuator to the ECU, and to compare the data intercepted to itself using autocorrelation that correlates a signal indicative of power demand at different intervals of time to determine if there are repeating power demand patterns that indicate sticking of a turbocharger component moved by the actuator, and to transmit a signal indicating that the turbocharger component is sticking if there are repeating power demand patterns that indicate sticking of a turbocharger component.

Variation 2 may include a product as set forth in Variation 1 wherein the turbocharger component is a moveable vane.

Variation 3 may include a product as set forth in Variation 1 wherein the turbocharger component is a wastegate valve.

Variation 4 may include a product as set forth in any of Variations 1-3 wherein the autocorrelation finds repetitive patterns in power demand that repeat during specific time intervals in the movement of the turbocharge component actuated by the actuator.

Variation 5 may include a product as set forth in any of Variations 1-4 wherein the autocorrelation correlates recovery phases of spikes in power demand that repeat during specific time intervals in the movement of the turbocharge component actuated by the actuator.

Variation 6 may include a product as set forth in any of Variations 1-5 wherein the diagnostic device compares the rate of occurrence of repeating patterns in the signal indicative of power demand to determine if the turbocharger component is sticking.

Variation 7 may include a product as set forth in any of Variations 1-6 wherein the diagnostic device is positioned between the electronic control unit (ECU) and the turbocharger actuator.

Variation 8 may include a product as set forth in any of Variations 1-7 wherein the diagnostic device is positioned in the electronic control unit (ECU).

Variation 9 may include a product as set forth in any of Variations 1-8 wherein the diagnostic device is positioned in the electronic controls integral to the actuator.

Variation 10 may include a product comprising an inline diagnostic device connected to a control status line at a position between an electronic control unit and a VTG turbocharger actuator, the inline diagnostic device being constructed and arranged to intercept data being transmitted from the actuator to the ECU, and to process the data to provide a binary OK/NOT OK determination or provide a numerical assessment of how stuck the vanes are.

Variation 11 may include a product as set forth in Variation 10 wherein the inline diagnostic device is constructed and arranged to transmit a signal indicating that the vanes are not sticking if the intercepted data is within a predetermined range of the known data.

Variation 12 may include a product as set forth in Variations 10-11 wherein the inline diagnostic device includes a microprocessor and memory.

Variation 13 may include a product as set forth in any of Variations 10-12 wherein the device is constructed and arranged to intercept data in a CAN high and a CAN low line of the control status line.

Variation 14 may include a product as set forth in any of Variations 10-13 wherein the inline diagnostic device is a CAN transceiver.

Variation 15 may include a product as set forth in any of Variations 10-14 wherein the inline diagnostic device is constructed and arranged to perform calculations regarding the intercepted data and make determinations as the whether or not the VTG turbocharger is experiencing vane sticking before the turbo charger vane completely stuck.

Variation 16 may include a product as set forth in any of Variations 10-15 wherein the inline diagnostic device is constructed and arranged to perform steps including calculating and determining if an increase in power draw by the actuator is greater than an acceptable percentage above a known amount of power draw under the operating conditions of the engine breathing system for a VTG turbocharger know not to be experiencing vane sticking.

Variation 17 may include a product as set forth in any of Variations 10-16 wherein the inline diagnostic device is constructed and arranged to perform steps including calculating and determining whether the frequency of an increase in current draw over a number of vane movement cycles is within an acceptable range.

Variation 18 may include a product as set forth in any of Variations 10-17 wherein the inline diagnostic device is constructed and arranged to perform steps including calculating and determining whether an increase in current draw is over that of a known good VTG turbocharger under the operating conditions occurs for a period of time which is longer than acceptable.

Variation 19 may include a method comprising of using the inline diagnostic device connected to a control status line at a position between an electronic control unit and a VTG turbocharger actuator, the inline diagnostic device being constructed and arranged to intercept data being transmitted from the actuator to the ECU, and to compare the data intercepted from the actuator with known data indicative of a VTG turbocharger assembly having vanes that are not sticking, wherein the inline diagnostic device is constructed and arranged to perform calculations regarding the intercepted data and make determinations as the whether or not the VTG turbocharger is experiencing vane sticking before the turbo charger vane completely stuck, the method comprising reading data transmitted by the actuator into a buffer of the device; determining whether the data is within a valid range, and if not, clearing the buffer, or if the data is within a valid range determining the vane performance, and based upon the determination generating a signal/indicator corresponding to the vane performance.

Variation 20 may include a method as set forth in Variation 19 wherein the inline diagnostic device is constructed and arranged to transmit a signal indicating that the vanes are not sticking if the intercepted data is within a predetermined range of the known data.

Variation 21 may include a method as set forth in any of Variations 19-20 wherein the inline diagnostic device includes a microprocessor and memory.

Variation 22 may include a method as set forth in any of Variations 19-21 wherein the device is constructed and arranged to intercept data in a CAN high and a CAN low line of the control status line.

Variation 23 may include a method as set forth in any of Variations 19-22 wherein the inline diagnostic device is a CAN transceiver.

Variation 24 may include a method as set forth in any of Variations 19-23 wherein the inline diagnostic device is constructed and arranged to perform calculations regarding the intercepted data and make determinations as the whether or not the VTG turbocharger is experiencing vane sticking before the turbo charger vane is completely stuck.

Variation 25 may include a method as set forth in any of Variations 19-24 wherein the inline diagnostic device is constructed and arranged to perform steps including calculating and determining if an increase in power draw by the actuator is greater than an acceptable percentage above a known amount of power draw under the operating conditions of the engine breathing system for a VTG turbocharger know not to be experiencing vane sticking.

Variation 26 may include a method as set forth in any of Variations 19-25 wherein the inline diagnostic device is constructed and arranged to perform steps including calculating and determining whether the frequency of an increase in current draw over a number of vane movement cycles is within an acceptable range.

Variation 27 may include a method as set forth in any of Variations 19-26 wherein the inline diagnostic device is constructed and arranged to perform steps including calculating and determining whether an increase in current draw is over that of a known good VTG turbocharger under the operating conditions occurs for a period of time which is longer than acceptable.

Variation 28 may include a product comprising an inline diagnostic device connected to a control status line at a position between an electronic control unit and an electric turbocharger actuator, the inline diagnostic device being constructed and arranged to intercept data being transmitted from the actuator to the ECU, and to compare the data intercepted from the actuator with known data indicative of known data that indicates sticking behavior of the component, and to transmit a signal indicating that the component is sticking if the intercepted data is outside a predetermined range of the known data.

The above description of select variations within the scope of the invention is merely illustrative in nature and, thus, variations or variants thereof are not to be regarded as a departure from the spirit and scope of the invention.

What is claimed is:

1. A product comprising an inline diagnostic device connected to a control status line at a position between an electronic control unit and any turbocharger actuator, the inline diagnostic device being constructed and arranged to intercept data being transmitted from the actuator to the ECU, and to compare the data intercepted from the actuator with known data indicative of the actuated component sticking, and to transmit a signal indicating that the actuated component is experiencing sticking behavior if the intercepted data is outside a predetermined range of the known data.

2. A method comprising of using an inline diagnostic device connected to a control status line at a position between an electronic control unit and a VTG turbocharger actuator, the inline diagnostic device being constructed and arranged to intercept data being transmitted from the actuator to the ECU, and to compare the data intercepted from the actuator with known data indicative of a VTG turbocharger assembly having vanes that are not sticking, wherein the inline diagnostic device is constructed and arranged to perform calculations regarding the intercepted data and make determinations as the whether or not the VTG turbocharger is experiencing vane sticking before the turbo charger vane is completely stuck, the method comprising reading data transmitted by the actuator into a buffer of the device; performing calculations and manipulations to the data to determine the condition of the moving components, and based upon the determination generating a signal/indicator corresponding to the condition of the moving components.

3. A product as set forth in claim 2 wherein the inline diagnostic device is constructed and arranged to transmit a signal indicating that the vanes are not sticking if the intercepted data is within a predetermined range of the known data.

4. A product as set forth in claim 2 wherein the inline diagnostic device includes a microprocessor and memory.

5. A product as set forth in claim 4 wherein the inline diagnostic device is constructed and arranged to perform steps including calculating and determining if an increase in power draw by the actuator is greater than an acceptable percentage above a known amount of power draw under the operating conditions of the engine breathing system for a VTG turbocharger know not to be experiencing vane sticking.

6. A product as set forth in claim 4 wherein the inline diagnostic device is constructed and arranged to perform steps including calculating and determining whether the frequency of an increase in current draw over a number of vane movement cycles is within an acceptable range.

7. A product as set forth in claim 4 wherein the inline diagnostic device is constructed and arranged to perform steps including calculating and determining whether an increase in current draw is over that of a known good VTG turbocharger under the operating conditions occurs for a period of time which is longer than acceptable.

8. A product as set forth in claim 4 wherein the device is constructed and arranged to intercept data in a CAN high and a CAN low line of the control status line.

9. A product as set forth in claim 4 wherein the inline diagnostic device is a CAN transceiver.

10. A product comprising an inline diagnostic device positioned between an electronic control unit and a VTG turbocharger actuator, the inline diagnostic device being constructed and arranged to intercept data being transmitted from the actuator to the ECU, and to process the data to provide a binary OK/NOT OK determination or provide a numerical assessment of how stuck the vanes are.

11. A product as set forth in claim 10 wherein the inline diagnostic device is constructed and arranged to transmit a signal indicating that the vanes are not sticking if the intercepted data is within a predetermined range of the known data.

12. A product as set forth in claim 10 wherein the inline diagnostic device includes a microprocessor and memory.

13. A product as set forth in claim 10 wherein the device is constructed and arranged to intercept data in a CAN high and a CAN low line of the control status line.

14. A product as set forth in claim 10 wherein the inline diagnostic device is a CAN transceiver.

15. A product as set forth in claim 10 wherein the inline diagnostic device is constructed and arranged to perform calculations regarding the intercepted data and make determinations as the whether or not the VTG turbocharger is experiencing vane sticking before the turbo charger vane is completely stuck.

16. A product as set forth in claim 10 wherein the inline diagnostic device is constructed and arranged to perform steps including calculating and determining if an increase in power draw by the actuator is greater than an acceptable percentage above a known amount of power draw under the operating conditions of the engine breathing system for a VTG turbocharger know not to be experiencing vane sticking.

17. A product as set forth in claim 10 wherein the inline diagnostic device is constructed and arranged to perform steps including calculating and determining whether the frequency of an increase in current draw over a number of vane movement cycles is within an acceptable range.

18. A product as set forth in claim 10 wherein the inline diagnostic device is constructed and arranged to perform steps including calculating and determining whether an increase in current draw is over that of a known good VTG turbocharger under the operating conditions occurs for a period of time which is longer than acceptable.

19. A product as set forth in claim 4 wherein the inline diagnostic device is constructed and arranged to perform calculations regarding the intercepted data and make determinations as the whether or not the VTG turbocharger is experiencing vane sticking before the turbo charger vane is completely stuck.

* * * * *